(12) United States Patent
Contractor

(10) Patent No.: US 10,384,389 B2
(45) Date of Patent: Aug. 20, 2019

(54) APPARATUS FOR PERFORMING THREE-DIMENSIONAL PRINTING

(71) Applicant: BEEHEX, LLC, Colombus, OH (US)

(72) Inventor: Anjan Contractor, Cypress, TX (US)

(73) Assignee: BeeHex, Inc., Columbus, OH (US)

( * ) Notice: Subject to any disclaimer, the term of this patent is extended or adjusted under 35 U.S.C. 154(b) by 333 days.

(21) Appl. No.: 15/064,370

(22) Filed: Mar. 8, 2016

(65) Prior Publication Data

US 2017/0259482 A1  Sep. 14, 2017

(51) Int. Cl.
| | |
|---|---|
| *B29C 64/343* | (2017.01) |
| *B29C 64/106* | (2017.01) |
| *B29C 64/205* | (2017.01) |
| *B29C 48/18* | (2019.01) |
| *B33Y 30/00* | (2015.01) |
| *B29C 64/209* | (2017.01) |
| *B29C 48/92* | (2019.01) |
| *B29C 48/02* | (2019.01) |
| *B29C 48/25* | (2019.01) |
| *B29C 48/285* | (2019.01) |

(Continued)

(52) U.S. Cl.
CPC .............. *B29C 48/18* (2019.02); *B29C 48/02* (2019.02); *B29C 48/266* (2019.02); *B29C 48/2886* (2019.02); *B29C 48/92* (2019.02); *B29C 64/106* (2017.08); *B29C 64/205* (2017.08); *B29C 64/209* (2017.08); *B29C 64/343* (2017.08); *B33Y 30/00* (2014.12); *B29C 48/05* (2019.02); *B29C 48/475* (2019.02); *B29C 2948/92571* (2019.02)

(58) Field of Classification Search
CPC ... B29C 64/205; B29C 64/209; B29C 64/307; B29C 64/321; B29C 64/343; B29C 64/227; B29C 64/236
USPC ......................................................... 425/375
See application file for complete search history.

(56) References Cited

U.S. PATENT DOCUMENTS

| | | | | |
|---|---|---|---|---|
| 4,536,147 A | * | 8/1985 | Groff .................. | A21C 3/08 425/146 |
| 8,565,925 B2 | * | 10/2013 | Lips .................... | A01C 23/042 222/1 |
| 9,552,915 B2 | | 1/2017 | Khan et al. | |

(Continued)

FOREIGN PATENT DOCUMENTS

| | | |
|---|---|---|
| CN | 103315371 A | 9/2013 |
| CN | 203841022 U | 9/2014 |

(Continued)

OTHER PUBLICATIONS

Basic Machines and How They Work, Chapter 1: Levers, Bureau of Naval Personnel, 1971, p. 2, 6.*

(Continued)

*Primary Examiner* — Philip C Tucker
*Assistant Examiner* — Jimmy R Smith, Jr.
(74) *Attorney, Agent, or Firm* — Rutan & Tucker, LLP; Kyle M. St. James

(57) ABSTRACT

A three-dimensional (3D) printer is disclosed. The 3D printer can print viscous material such as plastisol, polymer clay, melted sugar and melted chocolate. The 3D printer utilizes an extruder that can prevent dripping of viscous material from a nozzle. The 3D printer includes a control circuit for controlling the movement of the extruder and the air flow within a pneumatic system.

19 Claims, 6 Drawing Sheets

(51) Int. Cl.
*B29C 48/05* (2019.01)
*B29C 48/475* (2019.01)

(56) References Cited

U.S. PATENT DOCUMENTS

| | | |
|---|---|---|
| 9,649,814 B2 | 5/2017 | Yeh |
| 2011/0236552 A1 | 9/2011 | Vink |
| 2012/0168985 A1 | 7/2012 | Klaber |
| 2014/0120195 A1 | 5/2014 | Ploskonka |
| 2014/0154378 A1 | 6/2014 | von Hasseln et al. |
| 2014/0288699 A1 | 9/2014 | Williams et al. |
| 2015/0197063 A1 | 7/2015 | Shinar et al. |
| 2015/0287123 A1 | 10/2015 | Holman et al. |
| 2016/0000139 A1 | 1/2016 | Mou et al. |
| 2016/0066601 A1 | 3/2016 | Herr et al. |
| 2016/0067740 A1 | 3/2016 | Voris et al. |
| 2016/0067866 A1 | 3/2016 | Sekar et al. |
| 2016/0082652 A1 | 3/2016 | Snyder et al. |
| 2016/0100621 A1 | 4/2016 | Diaz et al. |
| 2016/0106142 A1 | 4/2016 | Contractor et al. |
| 2016/0135493 A1 | 5/2016 | Kuo et al. |
| 2016/0297149 A1 | 10/2016 | Albert et al. |
| 2016/0303801 A1 | 10/2016 | Chang et al. |
| 2016/0330992 A1 | 11/2016 | Von Hasseln et al. |
| 2016/0338545 A1 | 11/2016 | Shah et al. |
| 2017/0099867 A1 | 4/2017 | Corthesy-Malnoe et al. |
| 2017/0109925 A1 | 4/2017 | Gritzky et al. |
| 2017/0120527 A1 | 5/2017 | Miller et al. |
| 2017/0134716 A1 | 5/2017 | Naito |
| 2017/0148348 A1 | 5/2017 | Hardee et al. |

FOREIGN PATENT DOCUMENTS

| | | | |
|---|---|---|---|
| CN | 204070482 U | 1/2015 | |
| CN | 104365954 A | 2/2015 | |
| CN | 103720021 B | 5/2015 | |
| CN | 204635061 U | 9/2015 | |
| CN | 204653736 U | 9/2015 | |
| CN | 204682494 U | 10/2015 | |
| CN | 105196553 A | 12/2015 | |
| CN | 105394801 A | 3/2016 | |
| CN | 205492576 U | 8/2016 | |
| CN | 105922582 A | 9/2016 | |
| EP | 3162474 A1 | 5/2017 | |
| TW | M511764 U | 11/2015 | |
| TW | 201700156 A | 1/2017 | |
| WO | 2014/190168 A1 | 11/2014 | |
| WO | WO-2014190217 A1 * | 11/2014 | ............. A23P 20/20 |
| WO | 2015115897 A1 | 8/2015 | |
| WO | 2016033842 A1 | 3/2016 | |
| WO | 2016150960 A1 | 9/2016 | |
| WO | 2016161276 A1 | 10/2016 | |
| WO | 2017006330 A1 | 1/2017 | |
| WO | 2017039858 A1 | 3/2017 | |
| WO | 2017075277 A1 | 5/2017 | |
| WO | 2017081040 A1 | 5/2017 | |

OTHER PUBLICATIONS

3D Printer G-Codes website, [https://3dprinterchat.com/2016/02/3d-printer-g-codes/], last accessed Aug. 30, 2017.
PCT/US2017/043270 filed Jul. 21, 2017 International Search Report and Written Opinion dated Sep. 27, 2017.

* cited by examiner

US 10,384,389 B2

APPARATUS FOR PERFORMING THREE-DIMENSIONAL PRINTING

BACKGROUND OF THE INVENTION

1. Technical Field

The present invention relates to printers in general, and in particular to a printer for performing three-dimensional printing.

2. Description of Related Art

Three-dimensional (3D) printing is a process of making a 3D solid object through an additive process, in which successive layers of material are laid down based on a digital model. Three most commonly used 3D printing methods are stereolithography, selective laser sintering and fused deposition method.

A 3D printer typically includes an extruder (or print head) having a nozzle. A build material, which originates from an upstream feed of a raw polymer in the form of a filament, is fed into an upper region of the extruder as a solid. After being melted within the extruder, the filament exits the extruder in its molten form via the nozzle in a continuous stream. The melted filament can be deposited onto a build platform layer-by-layer. By adding hundreds or thousands thin layers of build material on top of one another, a 3D solid object is created.

Typically used for prototyping, 3D printing is considered a distinct field in the area of injection molding of raw plastic materials.

SUMMARY OF THE INVENTION

In accordance with a preferred embodiment of the present invention, a three-dimensional printer includes a printer cartridge, an extruder, a pneumatic system and multiple rods and screws. The printer cartridge contains a print material. The extruder includes an extruder syringe barrel and a nozzle. The pneumatic system includes a first air path and a second an path. During a printing operation, the first air path allows pressurized air to push the print material from the printer cartridge to the extruder syringe barrel of the extruder. When the printing operation stops, the second air path allows pressurized air to prevent any unwanted dripping of the print material out of the nozzle of the extruder. The rods and screws guide the extruder to dispense the print material at specific locations to form a three-dimensional solid object on a build platform.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1A:
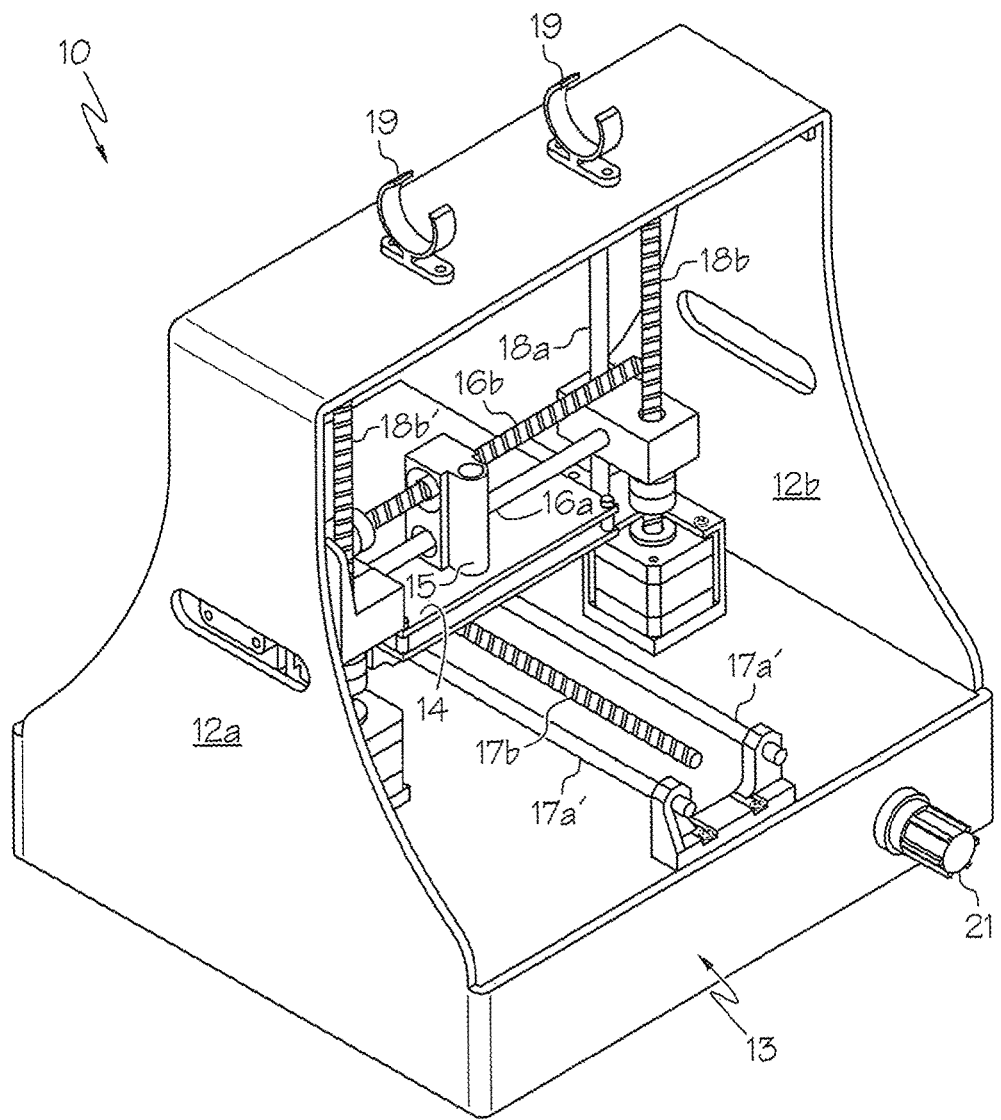
FIGS. 1A-1C are an isometric view, front view and cross-sectional view of a three-dimensional (3D) printer, respectively, in accordance with a preferred embodiment of the present invention.
Figure 1B:
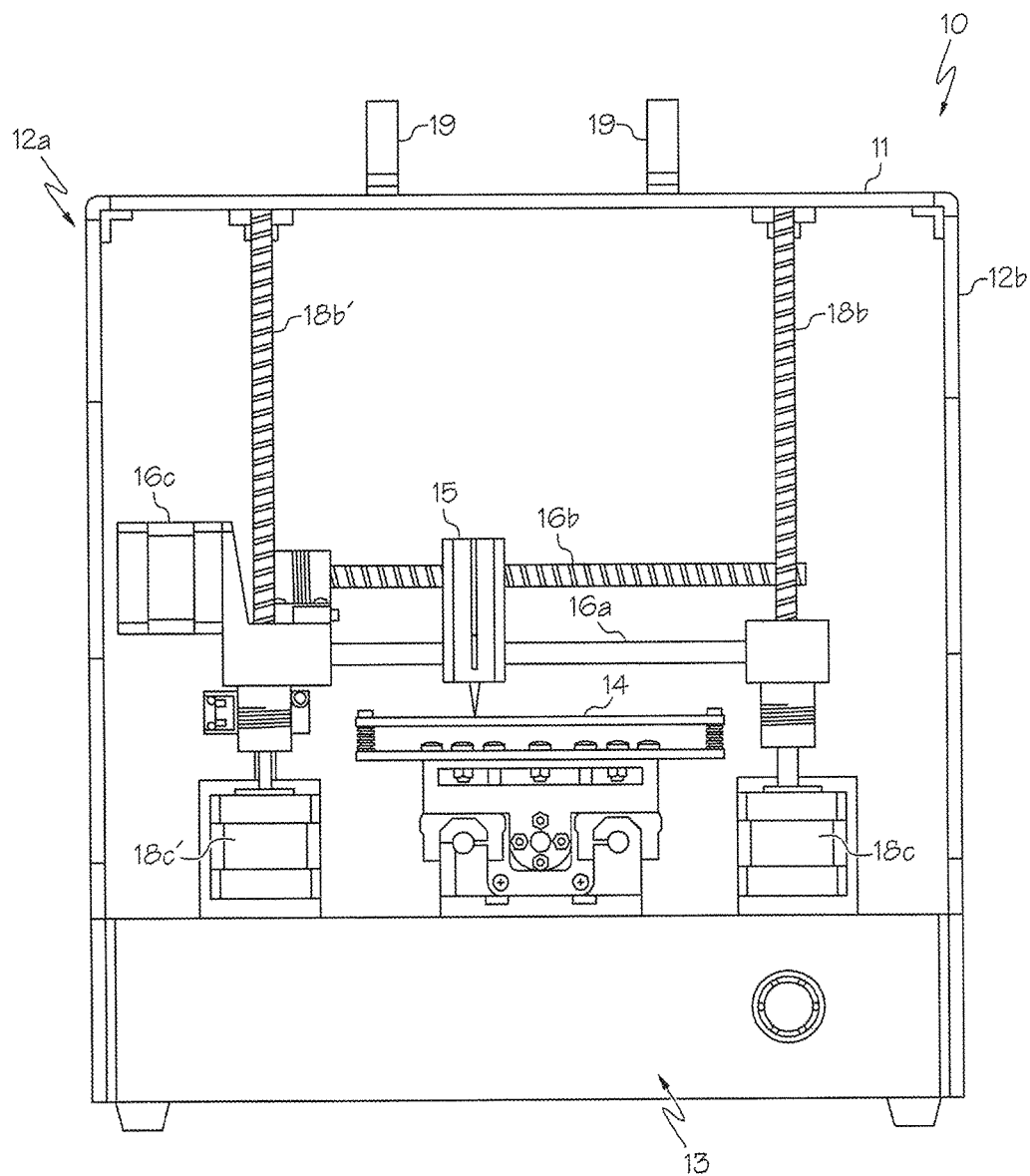
Figure 1C:
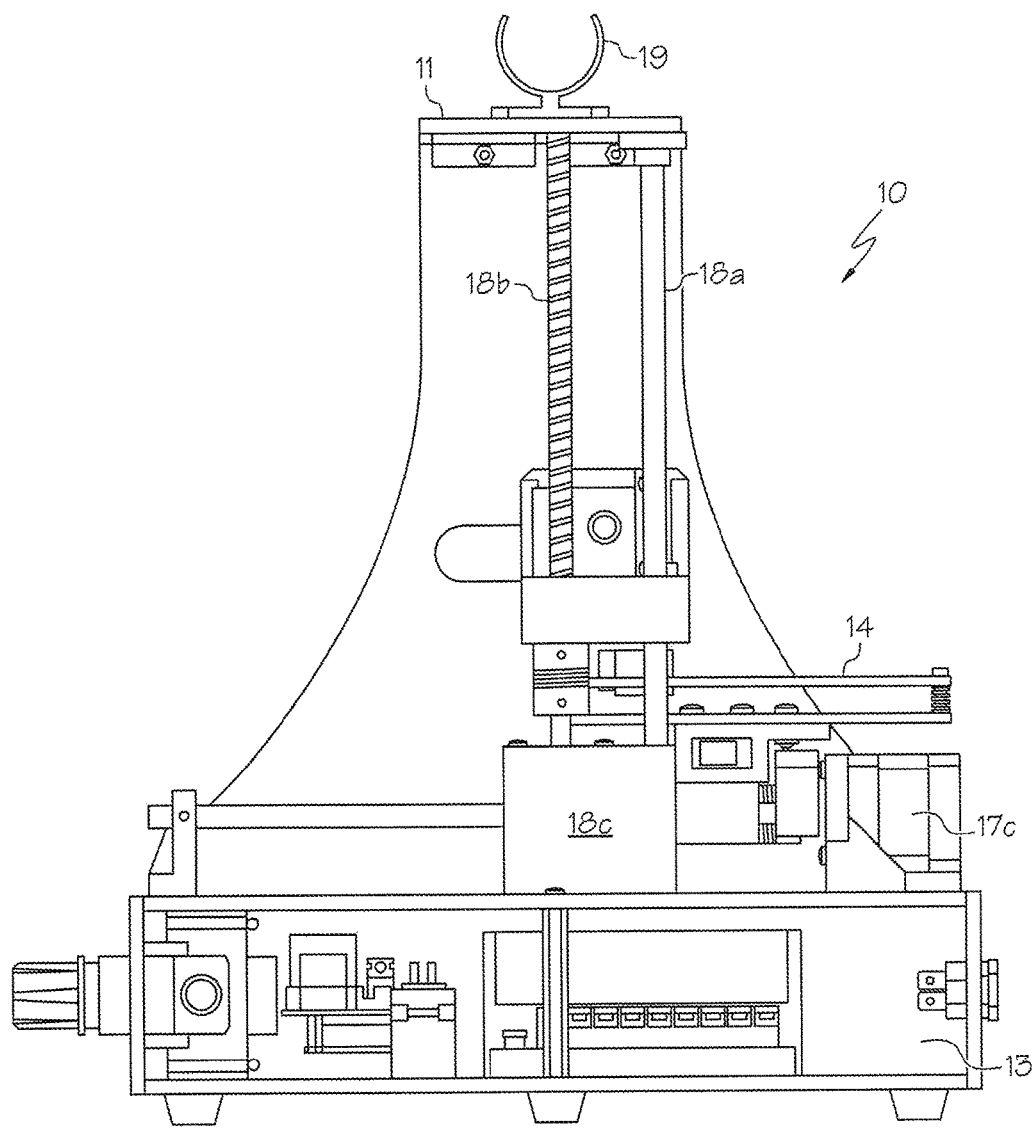

Referring now to the drawings and in particular to FIG. 1A-1C are an isometric view, front view and cross-sectional view of a three-dimensional (3D) printer, respectively, in accordance with a preferred embodiment of the present invention. As shown, a 3D printer 10 includes a chassis formed by a top panel 11, a pair of side panels 12a, 12b and a bottom compartment 13. Preferably, side panels 12a, 12b are in trapezoidal shapes, although other shapes are also acceptable.

3D printer 10 also includes components such as one X-axis rod 16a in parallel with one X-axis screw 16b, two Y-axis rods 17a, 17a' in parallel with one Y-axis screw 17b, and two Z-axis rods 18a-18a' in parallel with two Z-axis screws 18b-18b'. X-axis screw 16b is turned by an X-axis stepper motor 16c to move an extruder 15 in an X direction. Y-axis screw 17b is turned by a Y-axis stepper motor 17c to move a build platform 14 in a Y direction. Z-axis screws 18b-18b' are turned by Z-axis stepper motors 18e-18c', respectively, to move X-axis rod 16a, X-axis screw 16b, X-axis stepper motor 16c along with extruder 15 together in a Z direction. Rods 16a, 17a, 18a-18a' and screws 16b, 17b, 18b-18b' guide extruder 15 to dispense a print material at specific locations layer-by-layer to form a 3D solid object on build platform 14.

Bottom compartment 13 may contain a circuit board, a power supply and a pneumatic system having an air intake 21.

A printer cartridge (see FIG. 4) containing a print material can be secured on top panel 11 via a pair of cartridge mounts 19. The printer cartridge may contain print material such as plastisol, polymer clay, melted sugar and melted chocolate. The print material can be pushed out of the printer cartridge via a piston, and then travels through the pneumatic system to enter extruder 15.

Figure 2:
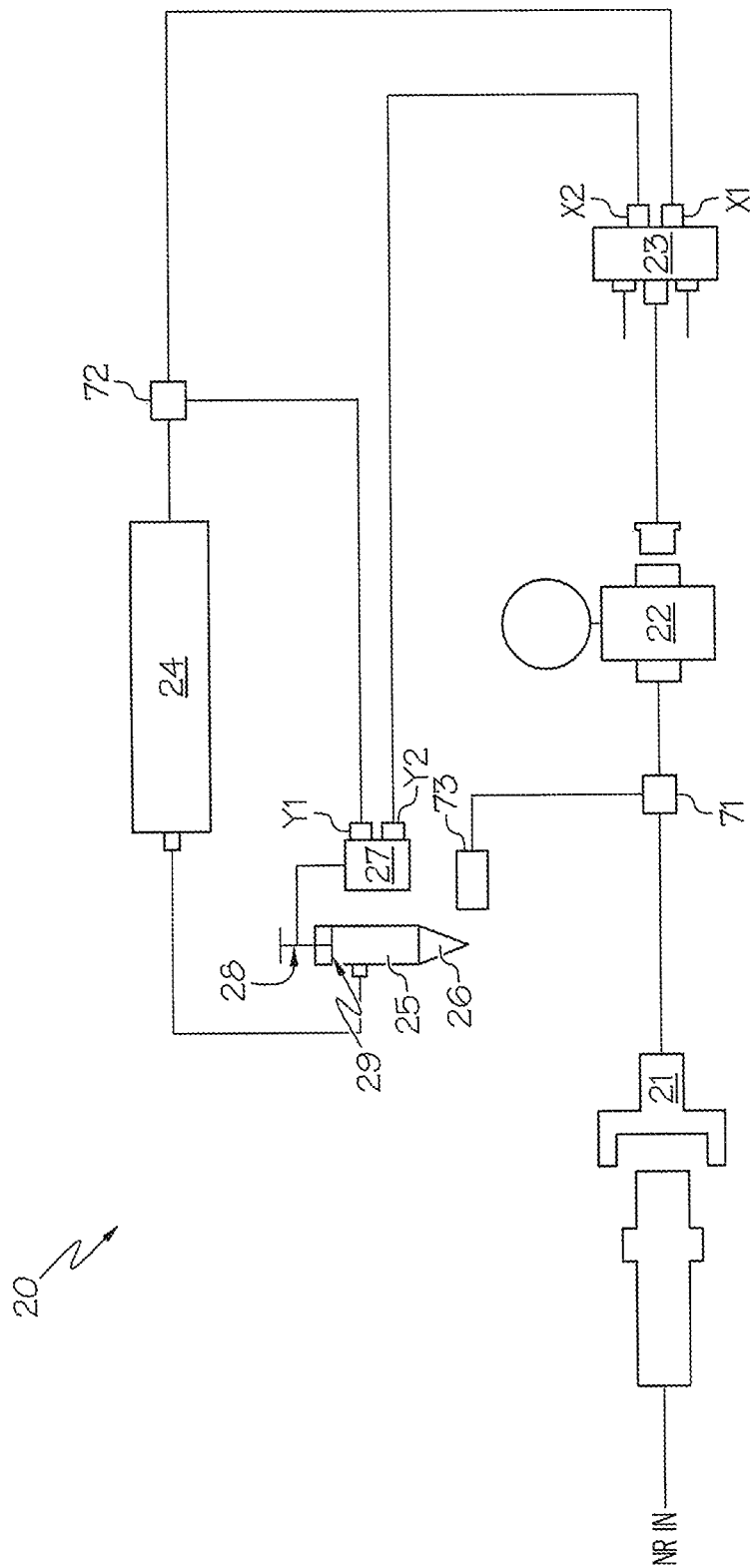
FIG. 2 is a block diagram of a pneumatic system within the 3D printer from FIG. 1, in accordance with a preferred embodiment of the present invention.

With reference now to FIG. 2, there is depicted a block diagram of a pneumatic system within 3D printer 10, in accordance with a preferred embodiment of the present invention. As shown, a pneumatic system 20 includes air intake 21, a pressure regulator 22, a solenoid valve 23, a cartridge barrel 24 and an extruder syringe barrel 25. Cartridge barrel 24 is contained within a printer cartridge, and extruder syringe barrel 25 is contained within extruder 15 (from FIG. 1). Pressurized air enters 3D printer 10 via air intake 21 and proceeds to pressure regulator 22. Pressure regulator 22 regulates the pressure of the incoming pressurized air. Because each type of print materials has a different viscosity (e.g., ink verses food ingredients), each type of print materials is associated with a unique pressure setting, which can be set by an operator of 3D printer 10.

Pressurized air regulated at a specific pressure then enters solenoid valve 23. Solenoid valve 23 has one entry port and two exit ports x1, x2. Pressurized air may exit if solenoid valve 23 through either exit port x1 or exit port x2 at any given time based on an electrical signal from a processor (see FIG. 5). Pressurized air can only exit solenoid valve 23 through either exit port x1 or exit port x2 at any given time, and never exit solenoid valve 23 through both exit port x1 and exit port x2 at the same time.

During a printing operation, pressurized air exits solenoid valve 23 via exit port x1 and enters a Y-connector 72 that sends the pressurized air to cartridge barrel 24 and an air-activated pneumatic piston 27. Within cartridge barrel 24, the pressurized air pushes a piston (not shown) that, in turn, pushes the print material out of cartridge barrel 24. The print material then enters extruder syringe barrel 25. The pressurized air also enter pneumatic piston 27 via an entry port y1. Pneumatic piston 27 is connected to a lever arm 28 and a plunger 29. After extruder syringe barrel 25 has been filled with the print material, the print material can then be selectively extruded out of a nozzle 26 by plunger 29 according to a digital design file.

When printing has already been stopped, because of the fluid nature of the print material and gravitational pull, the print material may still be dripping out of nozzle 26. In order to prevent unwanted dripping, of the print material out of nozzle 26, pneumatic piston 27, lever arm 28 and plunger 29 are utilized to provide back pressure within extruder syringe barrel 25. Specifically, pressure is released from exit port x1 to stop printing, and pressure is immediately applied to exit port x2 such that pressurized air exits solenoid valve 23 via exit port x2 and enters pneumatic piston 27 via entry port y2 to raise lever arm 28. Lever arm 28 is connected to plunger 29. When lever arm 28 is raised, plunger 29 is also raised within extruder syringe barrel 25 to change the internal volume of extruder syringe barrel 25, which instantaneously produces a suction within extruder syringe barrel 25 to prevent the print material from dripping through nozzle 26.

When the print material needs to be extruded out of nozzle 26 again (i.e., printing resumes), pressurized air is switched from exiting solenoid valve 23 via exit port x2 back to exiting solenoid valve 23 via exit port x1. At this instance, pressurized air from 1E solenoid valve 23 again pushes the print material from cartridge barrel 24 to extruder syringe barrel 25 and nozzle 26.

Alternatively, plunger 29 within extruder syringe barrel 25 can be pulled or pushed by using a spring mechanism (not shown) to generate or release a suction within extruder syringe barrel 25.

The temperature of pressurized air is generally colder than the ambient temperature when being released, and pressurized air can be utilized during printing to cool down a certain printed material coming out of nozzle 26 in order for the printed material to retain its shape. For example, when melted chocolate is being pushed out of nozzle 26, pressurized air can be released from a cooling diffuser 73 to make the temperature surrounding nozzle 26 lower than the melted chocolate coming out of nozzle 26, and as a result, the melted chocolate will be solidified instantaneously.

Figure 3B:
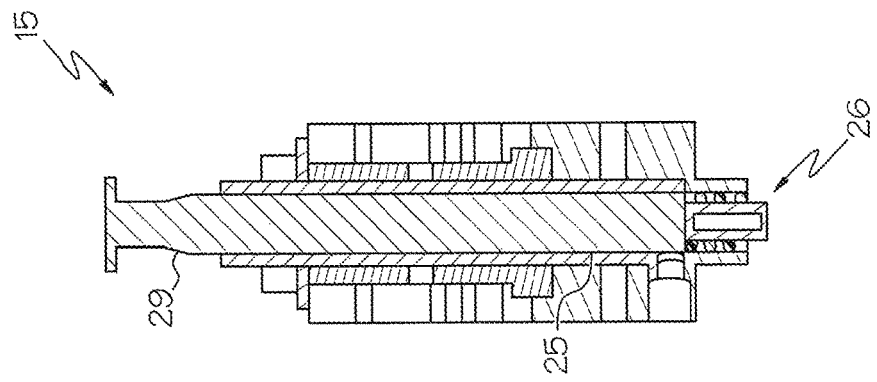
FIGS. 3A-3B are side and cross-sectional views of an extruder within the 3D printer from FIG. 1, in accordance with a preferred embodiment of the present invention.
Figure 3A:
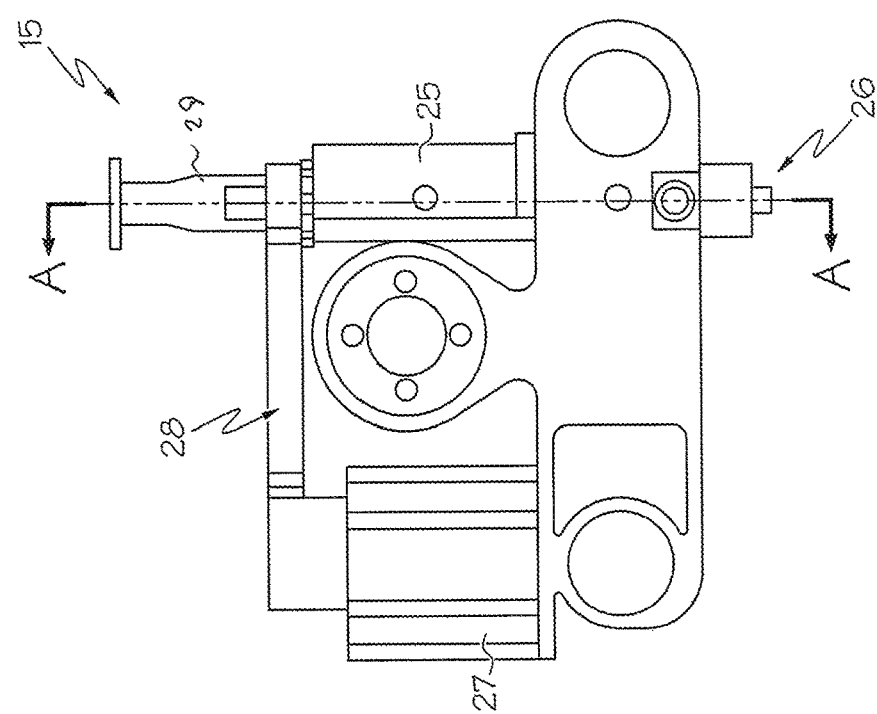

Referring now to FIGS. 3A-3B, there are depicted a side view and a cross-sectional view of extruder 15, respectively, in accordance with a preferred embodiment of the present invention. FIG. 3B is a cross-section view taken along line A-A of FIG. 3A. As shown, extruder 15 includes extruder syringe barrel 25, nozzle 26, pneumatic piston 27, lever arm 28 and plunger 29. Pneumatic piston 27 can be activated by pressurized air to move up in a vertical direction. Since one side of lever arm 28 is attached to pneumatic piston 27, so when pneumatic piston 27 moves up, lever arm 28 also moves up. Since plunger 29 is attached to the other side of lever arm 28, so when lever arm 28 moves up, plunger 29 moves up with lever arm 28. A negative pressure (or suction) is then produced within extruder syringe barrel 25 when plunger 29 moves up within extruder syringe barrel 25, and the negative pressure can prevent any unwanted dripping of print material through nozzle 26.

When printing is resumed, pneumatic piston 27 is retracted back to its original position, and lever arm 28 and plunger 29 also retracts back, which remove the negative pressure within extruder syringe barrel 25. As a result, a print material within extruder syringe barrel 25 can flow out of nozzle 26.

Figure 4:
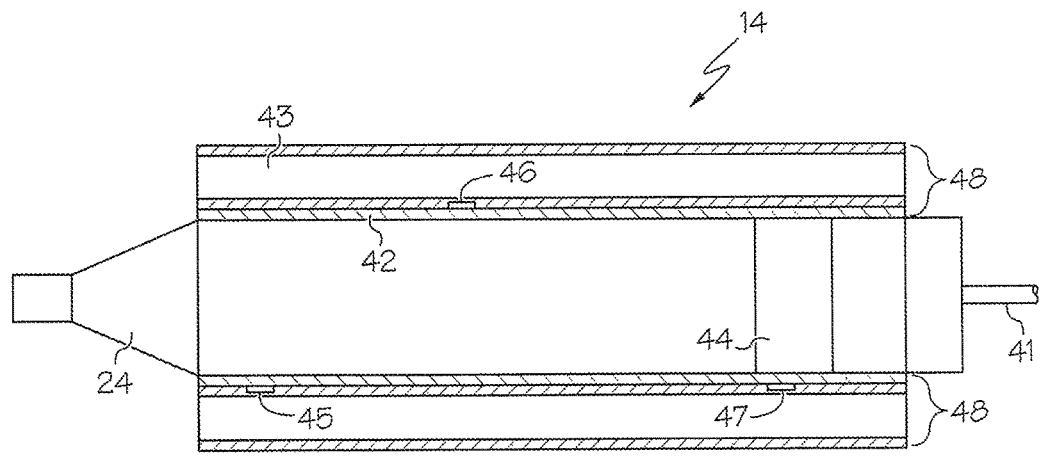
FIG. 4 is a cross-sectional diagram of a heating system within the 3D printer from FIG. 1, in accordance with a preferred embodiment of the present invention.

With reference now to FIG. 4, there is depicted a cross-sectional diagram of a heating system for providing heat to cartridge 14, in accordance with a preferred embodiment of the present invention. As shown, a heating system includes a cylindrical sleeve 48 covering cartridge barrel 24 having a pneumatic input line 41 for pushing a piston 44 within cartridge barrel 24. Sleeve 48 includes an inner core 42 covered by an outer core 43. Inner core 42 is made of a sheet of copper metal, and copper is chosen for its high thermal conductivity. Inner core 42 makes a tight contact with the surface of cartridge barrel 24. The outer surface of inner core 42 holds three thin and flexible polymide heaters 45, 46, 47. Heaters 45-47 can be heated up at the same time in order to provide an equal amount of heat energy at three different locations within inner core 42. Because of its high thermal conductivity, inner core 42 can distribute heat evenly across its entire surface almost instantaneously. Inner core 42 is connected to a thermistor 52 (from FIG. 5) for sending signals to a processor 54 (from FIG. 5). When the temperature of inner core 42 has reached a predetermined set-point, processor 54 can turn off power to heaters 45-47.

Outer core 43 is made of ABS plastic, and is designed to provide good insulation to inner core 42 from the environment. Outer core 43 also has a honeycomb pattern within its body sandwiched between two solid shells. This honeycomb structure provides superior thermal insulation in comparison to a solid piece of ABS plastic.

Figure 5:
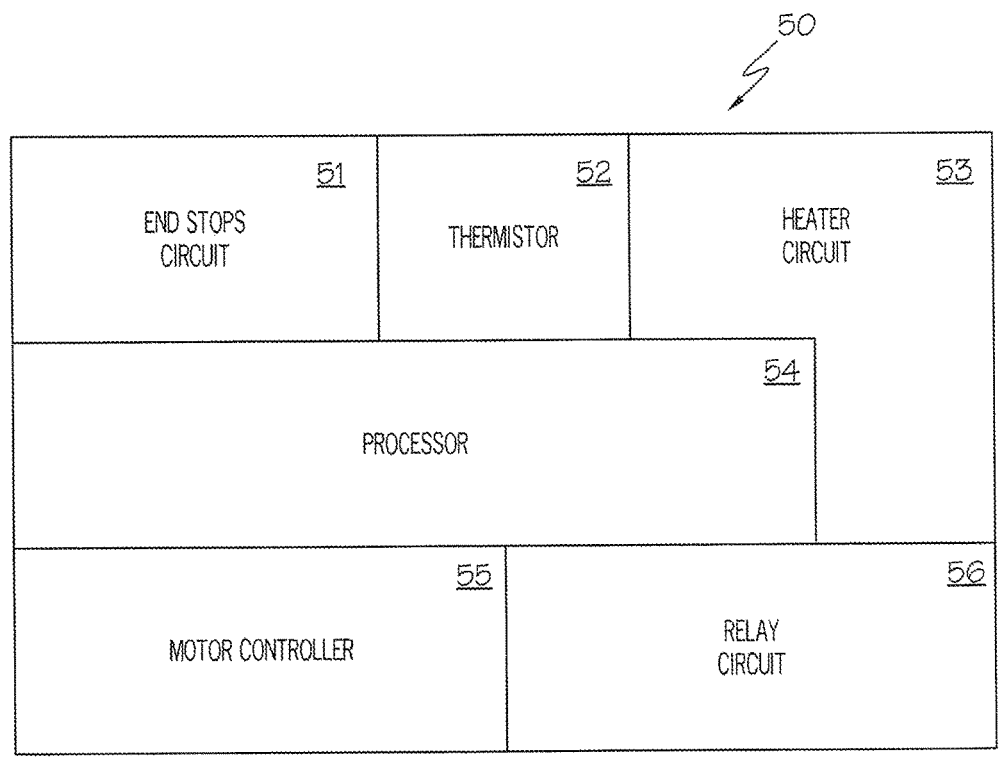
FIG. 5 is a block diagram of a circuit board for controlling various functions of the 3D printer from FIG. 1, in accordance with a preferred embodiment of the present invention.

Referring now to FIG. 5, there is illustrated a block, diagram of a circuit board for controlling various functions of 3D printer 10, in accordance with a preferred embodiment of the present invention. As shown, a circuit board 50, preferably located within bottom compartment 13 (from FIG. 1), includes end stop circuits 51, thermistor 52, a heater circuit 53, a processor 54, a motor controller 55, a relay circuit 56 and a USB port 57. End stop circuits 51 preferably provide three separate end stops: one for the X-axis, one for the Y-axis and one for the Z-axis. When carriage comes to a zero position of its respective axis, a sensor within end stop circuits 51 sends a voltage signal to processor 54. Thermistor 52 processes signal coming from a sensor and sends the signal to processor 54. Heater circuit 53 provides power to heater 45-47 (from FIG. 4). Motor controller 55 controls the movements of one X stepper motor, one Y stepper motor and two Z stepper motors. Relay circuit 56 controls various pneumatic valves in solenoid 23 (from FIG. 2). USB port 57 can be utilized to communicate with circuit board 50.

3D printer 10 is preferably operated by a software application that includes three separate parts. The first part includes a computer-aid design (CAD) software, which allows a user to create pick and place object on the drawing space. The second part allows the user to convert their digital creation into machine code or GCODE. The GCODE output has two different delays between the printing processes (i.e., X. Y and Z point locations). The first delay, which lasts about 100 microseconds, is caused by a delay in communication between processor 54 and relay circuit 56. The second delay, which lasts about 1,000 microseconds, is caused by the fact that viscous material takes some time to come out of nozzle 26 after a command has been given to push a piston by the pressurized air. The second delay depends highly upon the type of print material being used. Viscous materials have damping and spring effect properties, which make them slower or faster under pneumatic push. A user can adjust these timing based on the type of print material being used.

The third part controls various motors within 3D printer 10 to allow extruder 15 to print at various locations. 3D printer 10 can be controlled according to the generated GCODE, input manual GCODE and set cartridge temperature.

As has been described, the present invention provides a 3D printer for printing 3D solid objects.

While the invention has been particularly shown and described with reference to a preferred embodiment, it will be understood by those skilled in the art that various changes in form and detail may be made therein without departing from the spirit and scope of the invention.

What is claimed is:

1. An apparatus comprising:
   a printer cartridge having a cartridge barrel for containing a print material;
   an extruder having a nozzle;
   a pneumatic system having a first air path and a second air path and includes a Y-connector coupled to both the printer cartridge and a pneumatic piston, and wherein the Y-connector is configured to provide pressurized air to the printer cartridge and the pneumatic piston, wherein said first air path is configured to allow pressurized air to push said print material from said printer cartridge to said extruder, wherein said second air path is configured to allow pressurized air to prevent unwanted dripping of said print material out of said nozzle;
   a build platform; and
   a plurality of rods and screws for guiding said extruder to dispense said print material at specific locations to form a three-dimensional solid object on said build platform.

2. The apparatus of claim 1, wherein said pneumatic system includes a pressure regulator for regulating pressure of incoming pressurized air.

3. The apparatus of claim 1, wherein said pneumatic system includes a solenoid valve for selecting one of said first air path and said second air path.

4. The apparatus of claim 3, wherein said solenoid valve receives an electrical signal to control said selection of one of said first air path and said second air path.

5. The apparatus of claim 1, wherein said screws are turned by a plurality of stepper motors.

6. The apparatus of claim 1, wherein said extruder further includes a piston connected to a lever arm and a plunger to prevent unwanted dripping of said print material out of said nozzle.

7. The apparatus of claim 1, wherein said print material includes at least one of plastisol, polymer clay, melted sugar or melted chocolate.

8. The apparatus of claim 1, wherein said pneumatic system includes said pneumatic piston, wherein said pneumatic piston is configured to selectively provide said pressurized air to (i) push a plunger in said extruder, or (ii) raise said plunger in said extruder causing back pressure in said extruder to prevent said unwanted dripping of said print material out of said nozzle.

9. The apparatus of claim 1, further comprising:
   a cooling diffuser configured to provide pressurized air as said print material is extruded from said nozzle to cool said print material.

10. The apparatus of claim 1, further comprising:
    a heating system configured to provide heat to said printer cartridge.

11. An apparatus comprising:
    a printer cartridge having a cartridge barrel for containing a print material;
    an extruder having a nozzle and a plunger;
    a pneumatic system includes a solenoid valve having a first exit and a second exit for pressurized air and a Y-connector coupled to both said printer cartridge and said pneumatic system, wherein pressurized air exiting said solenoid valve via said first exit pushes said print material from said printer cartridge to said extruder via the Y-connector, wherein said Y-connector is configured to allow pressurized air exiting said Y-connector to cause a spring mechanism to pull said plunger within said extruder to generate a suction in order to stop said print material from dripping out of said nozzle;
    a build platform; and
    a plurality of rods and screws for guiding said extruder to dispense said print material at specific locations to form a three-dimensional solid object on said build platform.

12. The apparatus of claim 11, wherein said pneumatic system includes a pressure regulator for regulating the pressure of incoming pressurized air.

13. The apparatus of claim 11, wherein said solenoid valve receives an electrical signal to control selection of one of said first exit and said second exit.

14. The apparatus of claim 11, wherein said screws are turned by a plurality of stepper motors.

15. The apparatus of claim 11, wherein said print material includes plastisol.

16. The apparatus of claim 11, wherein said print material includes polymer clay.

17. The apparatus of claim 11, wherein said print material includes melted sugar.

18. The apparatus of claim 11, wherein said print material includes melted chocolate.

19. The apparatus of claim 11, wherein said pneumatic system includes a pneumatic piston, wherein said pneumatic piston is configured to selectively provide said pressurized air to (i) push a plunger in said extruder, or (ii) raise said plunger in said extruder causing back pressure in said extruder to prevent said dripping of said print material out of said nozzle.

* * * * *